United States Patent
Sere et al.

(10) Patent No.: US 10,157,128 B2
(45) Date of Patent: Dec. 18, 2018

(54) METHOD FOR ACCESS TO ALL THE CELLS OF A MEMORY AREA FOR PURPOSES OF WRITING OR READING DATA BLOCKS IN SAID CELLS

(71) Applicant: MORPHO, Issy-les-Moulineaux (FR)

(72) Inventors: Ahmadou Sere, Satrouville (FR); Frédéric Boulet, Le Perray en Yvelines (FR)

(73) Assignee: MORPHO, Issy les Moulineaux (FR)

( * ) Notice: Subject to any disclaimer, the term of this patent is extended or adjusted under 35 U.S.C. 154(b) by 102 days.

(21) Appl. No.: 14/758,655

(22) PCT Filed: Dec. 23, 2013

(86) PCT No.: PCT/EP2013/077934
§ 371 (c)(1),
(2) Date: Jun. 30, 2015

(87) PCT Pub. No.: WO2014/106605
PCT Pub. Date: Jul. 10, 2014

(65) Prior Publication Data
US 2015/0356008 A1    Dec. 10, 2015

(30) Foreign Application Priority Data
Jan. 7, 2013  (FR) .................................. 13 50108

(51) Int. Cl.
*G06F 12/00*       (2006.01)
*G06F 12/02*       (2006.01)
(Continued)

(52) U.S. Cl.
CPC ...... *G06F 12/0284* (2013.01); *G06F 12/1408* (2013.01); *G06F 7/582* (2013.01); *G06F 12/0292* (2013.01); *G06F 2212/251* (2013.01)

(58) Field of Classification Search
CPC ........ G06F 7/582; G06F 12/0292; G06F 7/58; G06F 12/1408
See application file for complete search history.

(56) References Cited

U.S. PATENT DOCUMENTS 5,251,165 A * 10/1993 James, III ............... G06F 7/582
                                                        708/250
2003/0163718 A1* 8/2003 Johnson .............. G06F 12/1408
                                                        713/193

(Continued)

OTHER PUBLICATIONS

Mar. 5, 2014 Search Report issued in International Application No. PCT/EP2013/077934.

*Primary Examiner* — Arvind Talukdar
(74) *Attorney, Agent, or Firm* — Oliff PLC; R. Brian Drozd

(57) ABSTRACT

A method for access to all cells in a memory area for purposes of writing or reading data blocks in the cells may include, for each access time (Ti with i=0 to N) to the cells in the memory area to be accessed, a process of determining the address (ADRj, with j=0 to N) of the cell of the memory area to be accessed at the access time (Ti), an address (ADRj) determined for an access time Ti not being once again determined for another access time (Tk, k≠j). The process of determining each address (ADRj) may be a pseudorandom process. The method may be used, for example, in any type of card, chip card, SIM card, etc., which includes a processing unit, such as a microcontroller, for manipulating cryptographic data serving to identify and/or authenticate a user of such a card.

11 Claims, 3 Drawing Sheets

(51) Int. Cl.
    *G06F 12/14*         (2006.01)
    *G06F 7/58*          (2006.01)

(56) References Cited

U.S. PATENT DOCUMENTS

| | | | |
|---|---|---|---|
| 2008/0046737 A1* | 2/2008 | Mihm | G06F 21/79 |
| | | | 713/176 |
| 2009/0125686 A1 | 5/2009 | Jang | |
| 2010/0241680 A1* | 9/2010 | Schumacher | G06F 7/58 |
| | | | 708/255 |
| 2011/0029588 A1* | 2/2011 | Ross | G06F 7/58 |
| | | | 708/254 |

\* cited by examiner

METHOD FOR ACCESS TO ALL THE CELLS OF A MEMORY AREA FOR PURPOSES OF WRITING OR READING DATA BLOCKS IN SAID CELLS

The present invention relates to a method for access to all the cells in a memory area for purposes of writing or reading data blocks in said cells. The present invention finds particular interest, for example, in any type of card, chip card, SIM card etc., which comprises a processing unit, such as a microcontroller, for manipulating cryptographic data used for identifying and/or authenticating a user of such a card.

BACKGROUND

In general, a method for access to the cells of a memory area is used whenever a processing unit performs an operation of writing or reading data blocks in the cells of said memory area. This access operation consists, for the processing unit, at each access time, of generating an address that is then supplied on the addressing bus of a memory and either reading the data blocks stored in the cell at the address thus generated or writing a data block in said cell. The data blocks read in the cells of the memory area may be manipulated, that is to say processed, copied after processing, etc., by the processing unit or be transmitted after processing to an external processing unit. Likewise, the data blocks that are stored in the cells of said memory area may be data blocks that have been the subject of manipulations on the part of said processing unit, or data blocks that have been received from an external processing unit.

The manipulations of data blocks which relate to confidential information must be carried out by the processing unit in complete security. However, there exist analysis techniques, referred to as hidden channel analysis, such as for example the analysis of electrical consumption or of the emission of electromagnetic radiation, performed during specific operations, that can make it possible to know this confidential information if precautions are not taken. Countermeasures are therefore generally taken.

Among these, techniques consist of integrating a random component in the access to the memory area that contains the data blocks corresponding to this confidential information, different whenever access is made so that a hidden channel analysis cannot make it possible to get to the confidential information.

One technique consists of choosing a random index prior to the operation of access to the memory area, and then accessing the cells of the memory area in question so that the access addresses are in an order that is shifted by this random index with respect to the order of the access times. Thus, at each manipulation of the data blocks of the memory area in question, the combination of the access addresses is in an order different from that of a previous manipulation, an order simply offset by the random index. This technique may prove to be insufficient against repeated statistical attacks, since the number of combinations of possible access addresses that is equal to the maximum size of the memory area to be accessed proves to be relatively small.

Another technique consists of generating an index by applying an interference mask, for example for the use of an addition method in the Galois field GF(2n) where the coefficients are elements of GF(2). Though this technique proves to be more effective against repeated statistical attacks than the previous technique, it does nevertheless have the drawback that the direct application of a mask is dependent on the size of the memory area to be addressed, in particular if it is not a power of 2. To remedy this drawback, it is necessary to divide the memory area to be accessed into sub-areas of sizes that are a power of 2 and to perform the accesses on each of these sub-areas. The sub-areas with a smaller size are however not suitably jammed. As a result the number of combinations of access addresses possible is still too small and it is not possible to choose the last index for a size of the memory area that is odd.

It therefore turns out that the known techniques of the prior art are not sufficiently resistant to attacks by hidden channel analysis because the possible number of combinations of the access addresses in the different orders is not sufficiently large and therefore do not withstand attacks over a relatively long time.

The aim of the invention is therefore to remedy the above-mentioned drawbacks of the techniques of the prior art and to propose a method for access to all the cells of a memory area for purposes of writing or reading data blocks in said cells where the possible number of combinations of access addresses is sufficiently high to make an effective analysis in a reasonable time of the information obtained by hidden channel analysis techniques.

SUMMARY

To this end, the invention concerns a method for access to all the cells in a memory area for purposes of writing or reading data blocks in said cells, said method including, for each access time Ti with i=0 to N to said cells in said memory area to be accessed, a process of determining the address ADRj, with j=0 to N, of the cell of the memory area to be accessed at said access time Ti, an address ADRj determined for an access time Ti not being once again determined for another access time Tk.

According to the invention, said process of determining each address ADRj is a pseudorandom process.

According to one embodiment of the invention, said pseudorandom address determination method comprises, implemented for each access time Ti:

a step of random determination of a random bit, which can thus take either a first value or a second value, a step of testing the value taken by said random bit that switches said process either to a step of determining an index as being equal to the value of a first index, followed by a step of incrementing a unit of said first index, or to a step of determining said index as being equal to the value of a second index, followed by a step of decrementing a unit of said second index, the value of said index being the value of said address of the cell of the memory area to be accessed at said access time Ti.

According to a first embodiment, said random determination step consists of randomly choosing the value of said random bit.

According to a second embodiment, said random determination step consists of extracting from a register the bit with a weight corresponding to the rank of the access time in question, said register storing a number previously determined in a pseudorandom fashion.

In a particular application, the number stored in said register has been determined during a previous instance of implementing the access method according to the invention by concatenation of all the random bits so that the random bit determined during the previous instance for access time of rank i is stored in the bit of said register the weight of which is equal to said rank i.

Advantageously, said memory area being of size N+1, the initial value of the first index is between 0 and N and the initial value of the second index is equal to the initial value of the first index to which the size of said memory area minus one is added.

For example, the initial value of the first index is determined in a random or pseudorandom manner.

According to a variant embodiment, said method consists, during an initialisation step, of determining the value of a random number. The address determination process further comprises, after determination of the value of the index for the access time Ti, a step of applying to the index thus determined a bitwise exclusive OR logic operation, said random number, the value resulting from said operation being the value of the address for access to the cell of the memory area to be accessed at said access time Ti.

According to another variant, said access method consists, during an initialisation step, of determining the value of a random number, and said pseudorandom process further comprises, after determination of the value of the index for the access time Ti, a step of calculating a mask value, a step of applying to said value of said random number a bitwise logic AND operation with said mask, and a step of applying, to the index determined for the access time Ti in question, a bitwise exclusive OR logic operation with the result of said logic AND operation, and the value resulting from the exclusive OR being the value of the address for access to the cell of the memory area to be accessed at said access time Ti.

Advantageously, said step of calculating a mask value consists of:
  positioning the most significant bit of said mask at zero and then, for each bit of weight i successively taking the values from S−1 to 1, S being the size in number of bits of the variables used for the logic operations,
  applying, to the bit of weight i of the determined index, an exclusive OR logic operation with the bit of weight i of the size of said memory area,
  applying, to said result of said exclusive OR logic operation, a logic OR operation with the bit of weight i of the mask,
  positioning the bit of weight i−1 of the mask at the value of the result of said logic OR operation.

Advantageously, said access method further comprises a step of shifting the addresses by adding or subtracting, to the value of the index IDX, the value of a number previously drawn randomly.

The present invention also relates to a device of the chip card type comprising a processing unit able to access a memory, either in writing or reading, which is characterised in that said control unit is designed to be able to implement an access method according to the invention as just described.

The present invention also relates to a program implemented on a memory medium, able to be used within a processing unit and comprising instructions for implementing an access method as just described.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION

Figure 1A:
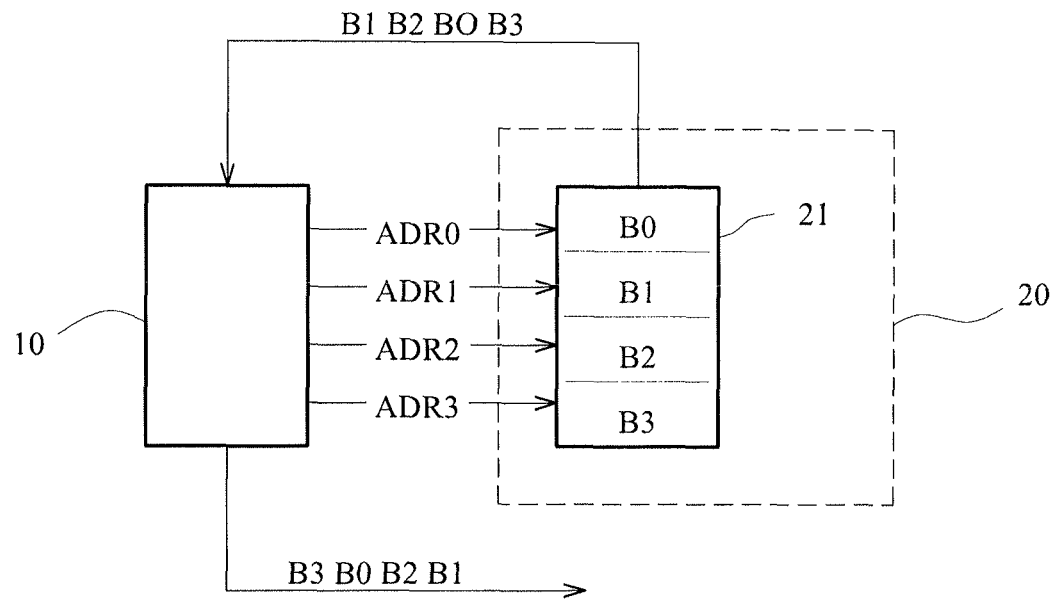
FIGS. 1a and 1b are simplified diagrams illustrating respectively the method for access to a memory area respectively for purposes of reading and writing.

FIG. 1a illustrates an operation of reading all the data blocks B0 to BN (here N=3) respectively stored in a memory area 21 of a memory 20 at the N+1 consecutive addresses ADR0 to ADRN. This reading operation consists, for each time Ti with i=0 to N, of a sequence of reading the memory area 21, for the control unit 10, determining an address ADRj with j=0 to N and reading the data block Bj stored at this address ADRj. Each address ADRj is determined according to an address-determination process that is such that an address ADRj determined for an access type Ti cannot be once again determined for another access time Tk, with k≠i. In addition, according to the invention, said address determination process is pseudorandom process, that is to say, for each Ti, the address ADRj is determined randomly or pseudorandomly.

As a result the order of reading of the data blocks B0 to BN read by the processing unit 10 does not correspond to the time order T0 to TN. In the case illustrated in FIG. 1a, this reading order is B1, B2, B0 and B3.

Figure 1B:
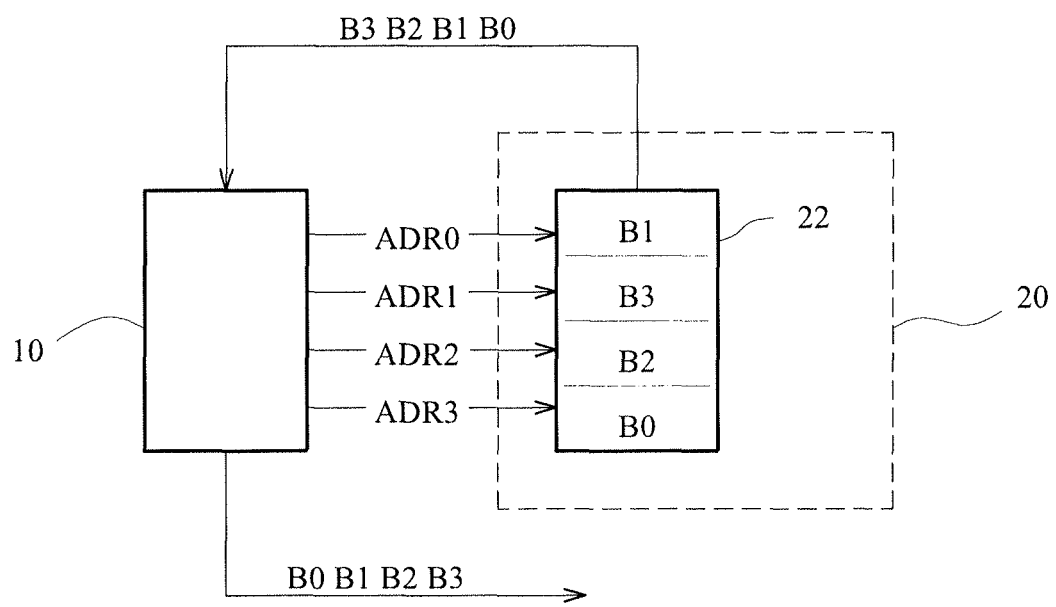

FIG. 1b illustrates an operation of writing data blocks B0 to BN in addresses ADR0 to ADRN of a memory area 22 of a memory 20. The writing operation consists, at each time Ti with i=0 to N, of a sequence of writing to the memory area 22, for the control unit 10, generating an address ADRj and writing the block Bi at this address ADRj. As before, each address ADRj is determined according to an address determination process that is such that an address ADRj determined for an access time Ti cannot be once again determined for another access time Tk, with k≠i. In addition, according to the invention, said address determination process is a pseudorandom process, that is to say, for each Ti, the address ADRj is determined randomly or pseudorandomly.

In FIG. 1b, the order of the data blocks that are written to by the processing unit 10 is B0, B1, B2 and B3 whereas the order of the addresses where these data blocks B0 to B3 are respectively written is ADR3, ADR0, ADR2 and ADR1.

In FIG. 1a, the data blocks read can be transmitted in their order of reading to a distant unit (not shown). They can also be stored in this order or in any other order in another memory area of the memory 20, as shown in FIG. 1b.

Likewise, in FIG. 1b, the data blocks that are stored in the memory area 22 may have been received from a distant unit (not shown). The time order of the writing thereof in the memory area 22 then corresponds to their order of reception in time. They may also have been read in this order or another in another memory area of the memory 20, according to a process such as the one that is described in relation to FIG. 1a.

Figure 2:
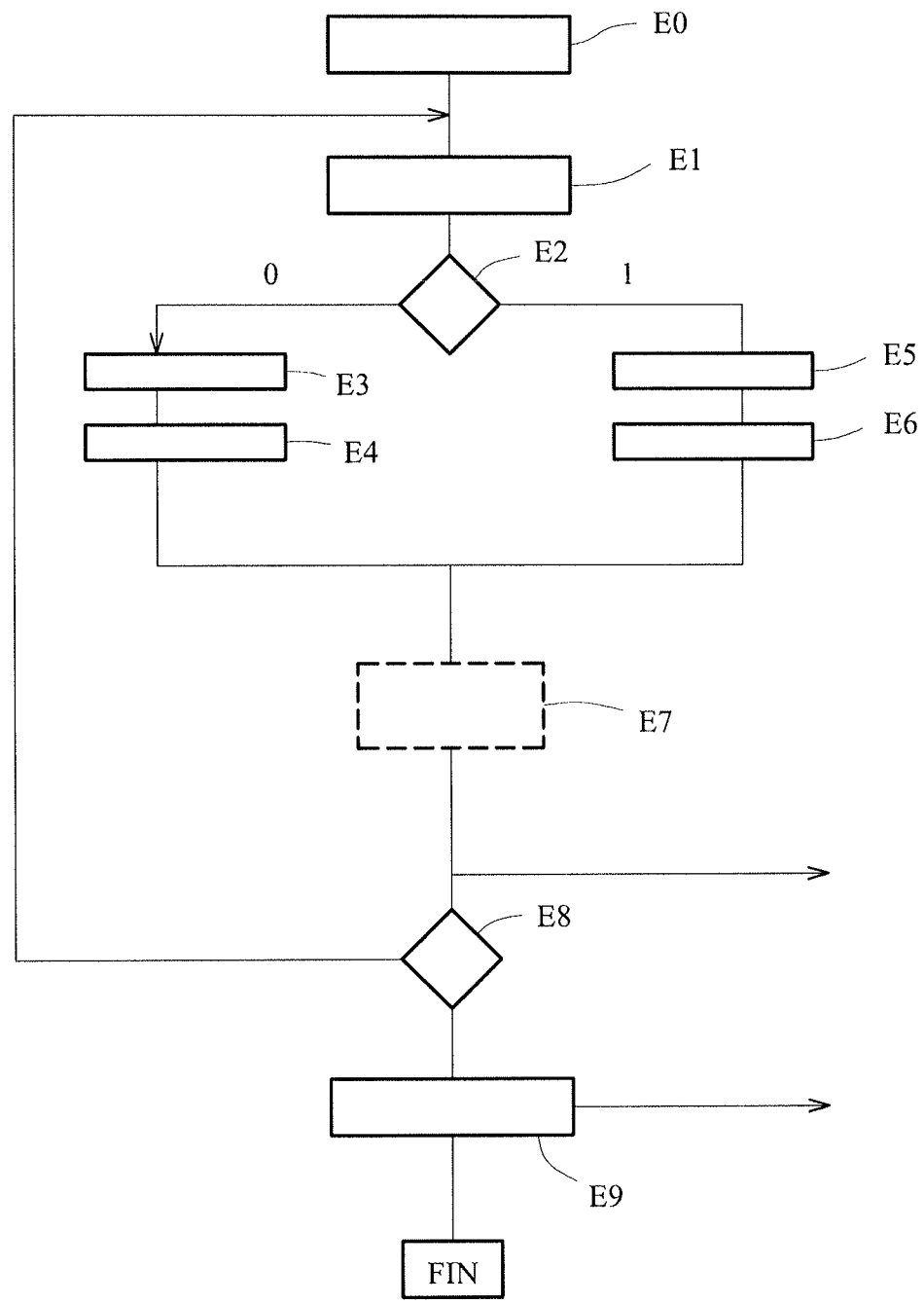
FIG. 2 is a diagram illustrating the various steps by a method of the invention.

FIG. 2 depicts a diagram illustrating the steps that are implemented during a reading operation or a writing operation as just described in relation to FIGS. 1a and 1b for determining the consecutive addresses ADRj with j=0 to N, respectively at the times Ti, with i=0 to N. All these steps form a method for access to all the cells of a memory area. This method is an iterative process with N+1 iterations, N+1 being the size of the memory area to be addressed. Each iteration is executed at a time Ti, with i=0 to N.

In a first step E1, a random bit Ai is determined, which may take either a first value, for example 0, or a second value, for example 1. According to a first embodiment, the value of the random bit Ai is determined randomly or pseudorandomly.

At step E2, if the value of the random bit Ai is a first value, for example 0, then at step E3, an index IDX takes the value of a first index UP and, following step E4, the value of the first index UP is incremented by one.

The incrementation operation is, for example, performed modulo N+1. For example, if N+1=8, the incrementation of the index UP that would have the value 7 will give the value 7+1=0. In general, incrementing the index UP that would have the value N will give the value 0.

At step E2, if the value of Ai is a second value, for example 1, then, at step E5, the index IDX takes the value of a second index DOWN and, following step E6, the value of the second index DOWN is decremented by one.

The decrementation operation is also, for example, performed modulo N+1. For example, if N+1=8, the decrementation of the index DOWN that would have the value 0 will give the value 0−1=7. In general, decrementing the index DOWN that would have the value 0 would give the value N.

Steps E4 and E6 are followed by an optional step E7 of processing the index IDX that will be described subsequently.

If no step E7 is implemented, which is considered for the moment, the value of the index IDX at time Ti, IDX(i) constitutes the value ADRj of the address that will be used for an operation of reading in or writing to the memory are in question. It is thus possible to write:

IDX(*i*)=ADRj

Steps E1 to E7 are repeated at each of the N+1 iterations of the access method. When the number of iterations executed has therefore been N+1, the access method is interrupted. For example, a check step E8 checks whether all the iterations have been performed. If such is not the case, the method is once again switched to step E1 for executing the next iteration (i=i+1). Otherwise it is stopped.

The check step E8 may for example effect a switching to step E1 as long as the index DOWN is less than the index UP and effect a switching to the end of the process when the index DOWN becomes equal to or greater than the index UP.

It can be noted that the incrementation E3 and decrementation E5 steps are preformed modulo N+1, and all the values taken by the index IDX are between 0 and N. In addition, a value of IDX is never taken twice during the execution of the steps of the iterative process. Thus all the memory area of size N+1 has been addressed, not in the order of the addresses ADR0 to ADRN but in a pseudorandom order, the global random value of which is given by each of the values of the random bits Ai.

At a step E9, this global random value can be calculated, which is denoted AG, constructed by concatenation of the random bits Ai. The nth bit of the random value AG corresponds to the bit Ai where i=n. This global random value AG, as will be shown in the remainder of the description, will make it possible to carry out an access method that is the dual of the access method as just described.

At step E0 of initialising the access method of the invention, the index UP is initialised to a random value between 0 and N, referenced ORG, and the index DOWN to this value increased by the size of the area to be addressed minus one, that is to say ORG+N.

We give below an example of implementation of the access method of the invention in this first embodiment.

Suppose N=7 and ORG=5. Then, at step E0, UP=5 and DOWN=12 modulo 8, that is to say 4.

At time t=0, suppose that step E1 gives 0. Then at step E3 the index IDX takes the value 5 and at step E4 the index UP is incremented in order to take the value 6. It is assumed that no step E7 is implemented.

The first addressing value ADR is therefore 5.

The following table gives the various values respectively taken by the random bits Ai, by the index UP, by the index DOWN and by the index IDX for access times Ti of index i=0 to N.

| i    | 0 | 1 | 2 | 3 | 4 | 5 | 6 | 7 |
|------|---|---|---|---|---|---|---|---|
| Ai   | 0 | 0 | 1 | 0 | 1 | 1 | 0 | 1 |
| UP   | 5 | 6 | 6 | 7 | 7 | 7 | 0 | 0 |
| DOWN | 4 | 4 | 4 | 4 | 4 | 3 | 2 | 1 |
| IDX  | 5 | 6 | 4 | 7 | 3 | 2 | 0 | 1 |

The value of the global random value AG calculated at step E9 is in this case 10110100 in binary, that is to say B4 in hexadecimal or 180 in decimal.

It will be noted that all the values lying between 0 and 7 are taken by the index IDX, and only once.

For example, it could be a case of an operation of writing in a memory area of size 8, of 8 data blocks Bi, i=0 to 7, each at a time Ti. Then this memory area will have the appearance given in the following Address/Data table:

| Address | Data |
|---------|------|
| 0       | B6   |
| 1       | B7   |
| 2       | B5   |
| 3       | B4   |
| 4       | B2   |
| 5       | B0   |
| 6       | B1   |
| 7       | B3   |

According to a second embodiment of the invention, said step E1 of determining the value of the random bit Ai for the access time Ti consists of extracting from a register, referred to as the random register, the value of which was previously determined, the bit the weight of which corresponds to the rank i of the access time Ti. The size of this register is equal to the size of the memory area to be addressed.

According to a particular embodiment, the number stored in the random register was determined during a previous instance of implementing the access method according to the invention, in particular of its step E9, as has just been explained. This number is therefore the global random value AG.

Thus there is available, in advance, firstly the global random value AG and secondly the origin ORG, the values of which are those that were determined during a previous access method.

We give below an example of implementation of a second embodiment of an access method according to the invention.

Assume N=7. The value ORG is equal to 5 and that of the global random value AG is equal to B4 in hexadecimal. These values are for example equal to those determined during the previous access method. At step E0, as before, UP is determined equal to 5 and DOWN to 4.

For the access time T0, the random bit extracted A0 is the least significant bit of AG, that is to say 0. Then at step E3 UP becomes equal to 6 and at step E4 the index IDX becomes equal to 6. It is assumed that no step E7 is implemented.

The first address value is therefore 5.

The following table gives the various values respectively taken by the random bits Ai, by the index UP, by the index DOWN and by the index IDX for access times Ti of index i=0 to N. It will be noted that they are identical to those taken by the example execution of the access method of the invention previously described.

| I    | 0 | 1 | 2 | 3 | 4 | 5 | 6 | 7 |
|------|---|---|---|---|---|---|---|---|
| Ai   | 0 | 0 | 1 | 0 | 1 | 1 | 0 | 1 |
| UP   | 5 | 6 | 6 | 7 | 7 | 7 | 0 | 0 |
| DOWN | 4 | 4 | 4 | 4 | 4 | 3 | 2 | 1 |
| IDX  | 5 | 6 | 4 | 7 | 3 | 2 | 0 | 1 |

For example, it could be a reading operation performed by addressing a memory area, such as the one that is given in the above Address/Data table and which results from an access method for purposes of a reading operation performed previously. It will easily be possible to verify that the data blocks read will now be, in order of time:

B0, B1, B2, B3, B4, B5, B6 and B7.

In another embodiment, a processing step E7 is implemented, which consists of applying to the index IDX a bitwise exclusive OR operation with a random number, denoted RND, drawn by chance before the method of determining addresses of the memory area is launched:

IDX=IDX XOR RND.

The truth table of the XOR (Exclusive OR) logic function is

|   | 0 | 1 |
|---|---|---|
| 0 | 0 | 1 |
| 1 | 1 | 0 |

Assume, by way of example, that RND is equal to 5 and that for IDX the values of the previous table have been obtained.

| IDX         | 5 | 6 | 4 | 7 | 3 | 2 | 0 | 1 |
|-------------|---|---|---|---|---|---|---|---|
| IDX XOR RND | 0 | 3 | 1 | 2 | 6 | 7 | 5 | 4 |

Let us take another example. The memory area to be addressed is in this example size 6. Therefore N+1=6.

Assume that the values of index IDX given in the following table have been obtained. RND is still equal to 5.

| IDX         | 1 | 0 | 2 | 5 | 4 | 3 |
|-------------|---|---|---|---|---|---|
| IDX XOR RND | 4 | 5 | 7 | 0 | 1 | 6 |

It is noted that, in this case, the addresses 7 and 6 are higher than the addresses of the memory area in question.

Figure 3:
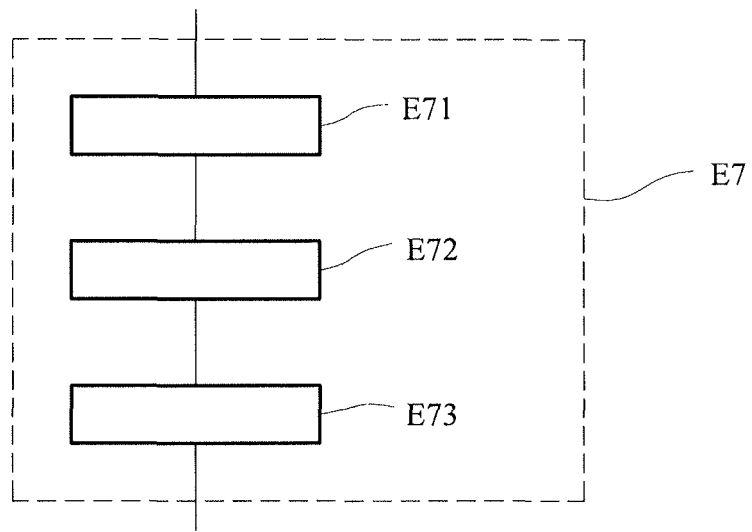
FIGS. 3 and 4 are diagrams illustrating the layer of steps constituting the processing step of the access method of FIG. 2.

To solve this problem of address overflow, in accordance with FIG. 3, step E7 includes the steps E71, E72 and E73.

Step E71 is a step of calculating a mask value MSK. If the size in bits of the variables is called S, the least significant bit of MSK is called MSK.bit[0], the $i^{th}$ bit of MSK is called MSK.bit[i] and the most significant bit of MSK is called MSK.bit[S−1].

According to the invention, the mask MSK is obtained as follows:

For i taking successively the values S−1 to 1,
MSK.bit[i−1]=MSK.bit[i] OR (MAX.bit[i] XOR IDX.bit[i]) and
MSK.bit[S−1]=0].

The truth table of the logic OR function is:

|   | 0 | 1 |
|---|---|---|
| 0 | 0 | 1 |
| 1 | 1 | 1 |

For the values of IDX given in the above table, the values of the mask MSK are as follows:

| IDX | 1 | 0 | 2 | 5 | 4 | 3 |
|-----|---|---|---|---|---|---|
| MSK | 3 | 3 | 3 | 1 | 1 | 3 |

At step E72, the mask MSK is applied to the value of the random number RND by means of a bitwise AND operation, in order to give a new random number RNDI.

RNDI=RND AND MASK

The truth table of the logic AND function is as follows:

|   | 0 | 1 |
|---|---|---|
| 0 | 0 | 0 |
| 1 | 0 | 1 |

At step E73, the random number RNDI thus calculated is applied to the value of the index IDX by a bitwise XOR (Exclusive OR):

IDX=IDX XOR RNDI

In the following table, the values taken by these different variables are given.

| IDX               | 1 | 0 | 2 | 5 | 4 | 3 |
|-------------------|---|---|---|---|---|---|
| MSK               | 3 | 3 | 3 | 1 | 1 | 3 |
| RNDI = MSK AND RND| 1 | 1 | 1 | 1 | 1 | 1 |
| IDX = IDX XOR RNDI| 0 | 1 | 3 | 4 | 5 | 2 |

It will be noted that all the values of the index IDX thus calculated now lie between 0 and 5 and therefore that they address the initial memory area without overflow thereof.

Figure 4:
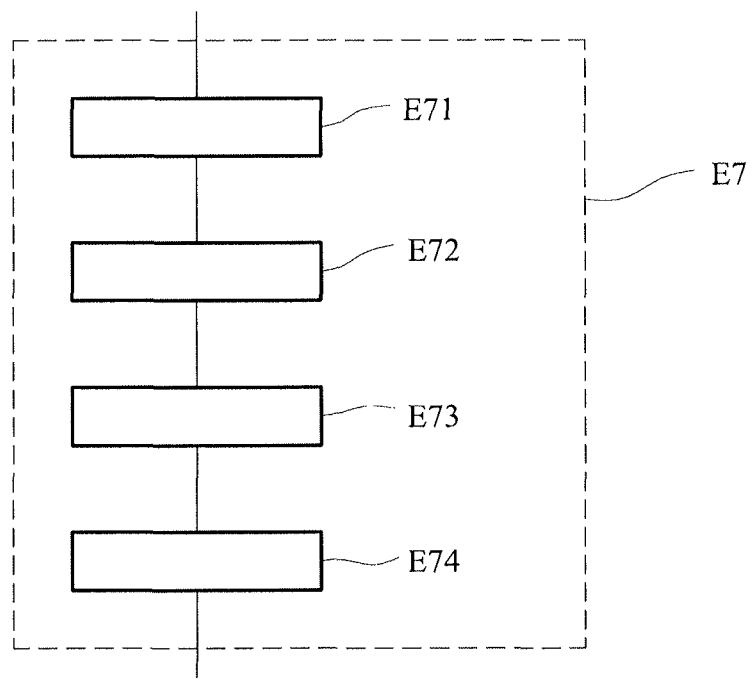

Through the use of steps E71, E72 and E73, memory areas of any size can be manipulated according to the invention. In a third embodiment illustrated in FIG. 4, the processing step E7 includes a step E74 of shifting the addresses by addition or subtraction to or from the value of the index IDX issuing from step E73 by the value of an offset DEC. The initialisation values of the indices UP and DOWN can then be respectively 0 and N.

The invention claimed is:

1. A method for access to all the cells in a memory area of a card for purposes of writing or reading data blocks in said cells, wherein said method comprises:

for each access time (Ti with i=0 to N) to said cells in said memory area to be accessed, a process of determining the address (ADRj, with j=0 to N) of the cell of the memory area to be accessed at said access time (Ti), an address (ADRj) determined for an access time Ti not being once again determined for another access time (Tk, k≠j), wherein said process of determining each address (ADRj) is a pseudorandom process and when the process has been executed N times, the process interrupted, wherein said pseudorandom address determination process comprises, implemented for each access time (Ti, i=0 to N):
  a step (E1) of random determination of a random bit (Ai), which can thus take either a first value or a second value,
  a step (E2) of testing the value taken by said random bit (Ai) that switches said process:
    either to a step (E3) of determining an index (IDX) as being equal to the value of a first index (UP), followed by a step (E4) of incrementing a unit of said first index (UP),
    or to a step (E5) of determining said index (IDX) as being equal to the value of a second index (DOWN), followed by a step (E6) of decrementing a unit of said second index (DOWN),
    the value of said index (IDX) being the value of said address of the cell of the memory area to be accessed at said access time (Ti); and
  during an initialisation step (E0), of determining the value of a random number (RND), and in that said determination process further comprises, after determination of the value of the index (IDX) for the access time (Ti), a step of applying to the index thus determined a bitwise exclusive OR logic operation with said random number (RND), the value resulting from said operation being the value of the address for access to the cell of the memory area to be accessed at said access time (Ti).

2. The access method according to claim 1, wherein said random determination step (E1) comprises: randomly choosing the value of said random bit.

3. The access method according to claim 1, wherein said random determination step (E1) comprises: extracting from a register the bit corresponding to the rank of the access time in question, said register storing a number previously determined pseudorandomly.

4. The access method according to claim 3, wherein the number stored in said register was determined during a previous instance of implementation of said determination step (E1) comprises: randomly choosing the value of said random bit by concatenation of all the random bits (Ai) so that the random bit determined during the first instance for an access time of rank (i) is stored in the bit of said register the weight of which is equal to said rank (i).

5. The access method according to claim 1, wherein, said memory area being of size N+1, the initial value of the first index (UP) is between 0 and N and the initial value of the second index (DOWN) is equal to the initial value of the first index to which the size of said memory area minus one is added.

6. The access method according claim 5, wherein the initial value of the first index is determined randomly or pseudorandomly.

7. The access method according to claim 1, wherein the access method comprises: during an initialisation step (E0), of determining the value of a random number (RND), and in that said address determination process further comprises, after determination of the value of the index (IDX) for the access time (Ti), a step (E71) of calculating a mask value (MSK), a step (E72) of applying to said value of the random number a bitwise logic AND operation with said mask (MSK), and a step (E73) of applying to the index determined for the access time (Ti) in question a bitwise exclusive OR logic operation with the result of said logic AND operation, the value resulting from the exclusive OR operation being the value of the address for access to the cell of the memory area to be accessed at said access time (Ti).

8. The access method according to claim 7, wherein said step (E71) of calculating a mask value comprises:
  positioning the most significant bit of said mask at zero and then, for each bit of weight i successively taking the values from S-1 to 1, S being the size in number of bits of the variables used for the logic operations,
  applying, to the bit of weight i of the determined index, an exclusive OR logic operation with the bit of weight i of the size of said memory area,
  applying to said result of said exclusive OR logic operation, a logic OR operation with the bit of weight i of the mask,
  positioning the bit of weight i-1 of the mask at the value of the result of said logic OR operation.

9. The access method according to claim 5, wherein the access method further comprises a step (E74) of shifting the addresses by adding or subtracting, to or from the value of the index (IDX), wherein the value comprises a number previously drawn randomly.

10. A device of the chip card type comprising a processing unit able to access a memory, either in writing or reading, wherein said processing unit is designed to be able to implement an access method according to claim 1.

11. A program implemented on a non-transitory memory medium, able to be used within a processing unit and comprising instructions for implementing an access method according to claim 1.

* * * * *